United States Patent [19]
D'Andrea

[11] Patent Number: 5,378,076
[45] Date of Patent: Jan. 3, 1995

[54] DEVICE FOR THE PRECISE COUPLING OF TWO CYLINDRICAL PARTS, ESPECIALLY TO FORM COMPOUND TOOLS

[75] Inventor: Ermanno D'Andrea, Lainate, Italy
[73] Assignee: D'Andrea S.p.A., Lainate, Italy
[21] Appl. No.: 988,997
[22] Filed: Dec. 11, 1992
[30] Foreign Application Priority Data
Dec. 20, 1991 [IT]  Italy ................... MI91 A003435
[51] Int. Cl.6 .......................... B23B 29/00; F16D 1/00
[52] U.S. Cl. .................... 403/379; 403/374; 403/361; 403/22; 82/159
[58] Field of Search ............ 403/299, 378, 379, 377, 403/361, 362, 367, 374, 22; 411/393, 354; 285/421; 82/159; 279/9.1, 83; 408/239 A, 239 R, 238; 409/232, 233, 234

[56] References Cited
U.S. PATENT DOCUMENTS

| | | | |
|---|---|---|---|
| 1,132,375 | 3/1915 | Myers | 403/379 |
| 1,797,730 | 3/1931 | Pfauser | 403/362 |
| 3,301,581 | 1/1967 | Winberg | 403/379 |
| 3,472,538 | 10/1969 | Vincent | 285/421 |
| 4,546,670 | 10/1985 | Gaspardo | 403/378 |
| 4,755,077 | 7/1988 | Eckle | 403/379 |
| 4,895,474 | 1/1990 | Eckle | 403/379 |
| 4,979,845 | 12/1990 | Scheer | 403/379 |
| 5,137,401 | 8/1992 | Muendlein | 403/379 |
| 5,243,884 | 9/1993 | Haga | 409/234 |

*Primary Examiner*—Eric K. Nicholson
*Assistant Examiner*—Anthony Knight
*Attorney, Agent, or Firm*—Kirschstein, Ottinger, Israel & Schiffmiller

[57] ABSTRACT

Device for the precise coupling of two cylindrical parts, especially to form compound tools, with the aid of two cylindrical bodies, one of which has a seat for accepting a pin projecting from the other cylindrical body, it being provided that the front end of the body with the coupling seat be given an inclined wall engageable with an inclined wall branching away from the base of the coupling pin of the other cylindrical body, that the transverse hole in the projecting pin accepts a threaded bush which engages with a cylindrical-headed screw, and that the free ends of the threaded bush and of the screw head have inclined circumferential surfaces engageable with inclined circumferential surfaces defining the transverse holes on the side facing the coupling seat.

8 Claims, 4 Drawing Sheets sections
DEVICE FOR THE PRECISE COUPLING OF TWO CYLINDRICAL PARTS, ESPECIALLY TO FORM COMPOUND TOOLS

BACKGROUND OF THE INVENTION

1. Field of the Invention

The present invention relates to a device for the coupling of two cylindrical parts, especially to form compound tools.

2. Description of the Related Art

The term "compound tools" should be understood to refer to conventional chip-removing tools such as drill bits, cylindrical cutters or taps, which in order to be used in a machine tool must be assembled with a cone element that is inserted into the chuck of the machine.

To enable the same tool to be used for different chip-removing operations, it is often necessary to provide the cone element and the chip-removing tool with one or more extensions: these consist of cylindrical constructional elements which must be coupled together rigidly and with the greatest precision.

It is known in the state of the art to join one end of one cylindrical body having a seat to a projection provided on the other cylindrical body, thus enabling the two extensions to be joined by means of a male-female coupling.

To achieve a firm connection, in the known device the projecting part is first inserted into the cavity of the adjacent cylindrical part and then locked in position with the aid of screws or grub screws inserted transversely into the two cylindrical bodies to be assembled.

In one known embodiment, inside the coupling pin is a small cylinder with conical ends. These ends engage with the abovementioned transverse grub screws, which likewise have conical ends and therefore, when the two traverse locking grub screws are screwed home, the projecting pin is locked inside the cavity receiving it. During the tightening, the two parallel end surfaces of the cylindrical bodies are tightened together, creating the extension for the tool.

In the known embodiment, a problem has been encountered in that the area of contact between the two cylindrical bodies is formed by two surfaces parallel with each other and perpendicular to the longitudinal axis of the cylindrical bodies being assembled; a fact which does not eliminate the danger of transverse movements and hence of the axes of the cylindrical bodies coming apart.

Furthermore in the known embodiment it has been found that because the angle of the cone of the locking grub screws assumes an angle of 45° to the longitudinal axis of the coupled cylindrical bodies, and therefore the force with which the locking grub screws are tightened is translated into an equal locking force. Since the force with which the locking grub screw is screwed in cannot be increased at will lest the thread be damaged, the locking force applicable between the two cylindrical bodies is accordingly limited, even though a greater locking force would increase the rigidity of the coupling of the two cylindrical bodies.

A further problem with the known embodiment is observable in the fact that, if wear develops in either the pin or the cavity forming the male-female coupling, the cylindrical bodies may move reciprocally along the parallel coupling surfaces, which is a cause of imprecise machining.

Finally, the known device requires the use of two locking screws or grub screws for the assembly stage. This not only increases the number of constructional elements needed, but also requires careful and balanced tightening of the two locking grub screws. In addition, these locking elements must be removed while the pin and cavity are being joined together, and then reinserted afterwards.

SUMMARY OF THE INVENTION

The object of the present invention is to provide a new assembly device of the type indicated, by means of which the problems associated with the state of the art can be eliminated, resulting in a more rigid coupling and eliminating any possibility of transverse movements between the cylindrical bodies, thus guaranteeing perfect self-centering of the cylindrical bodies with each other, and an axial locking of the greatest strength, by the use of simple and economical auxiliary means.

This object is achieved with the aid of two cylindrical bodies, one of which has a seat for accepting a pin projecting from the other cylindrical body, it being provided that the front end of the body with the coupling seat be given an inclined wall engageable with an inclined wall branching away from the base of the coupling pin of the other body, that the transverse hole in the projecting pin accepts a threaded bush which engages with a cylindrical-headed screw, and that the free ends of the threaded bush and of the screw head have inclined circumferential surfaces engageable with inclined circumferential surfaces defining the transverse holes on the side facing the coupling seat.

These arrangements result in a self-centering coupling (inclined walls) of the cylindrical bodies, and the tightening of the screw and bush generates a locking force between the cylindrical bodies being assembled.

BRIEF DESCRIPTION OF THE DRAWINGS

The subject designed according to the present invention will now be described in greater detail in the form of one embodiment given purely by way of example and illustrated in the attached drawings, in which.

DETAILED DESCRIPTION OF THE PREFERRED EMBODIMENTS

Figure 1:
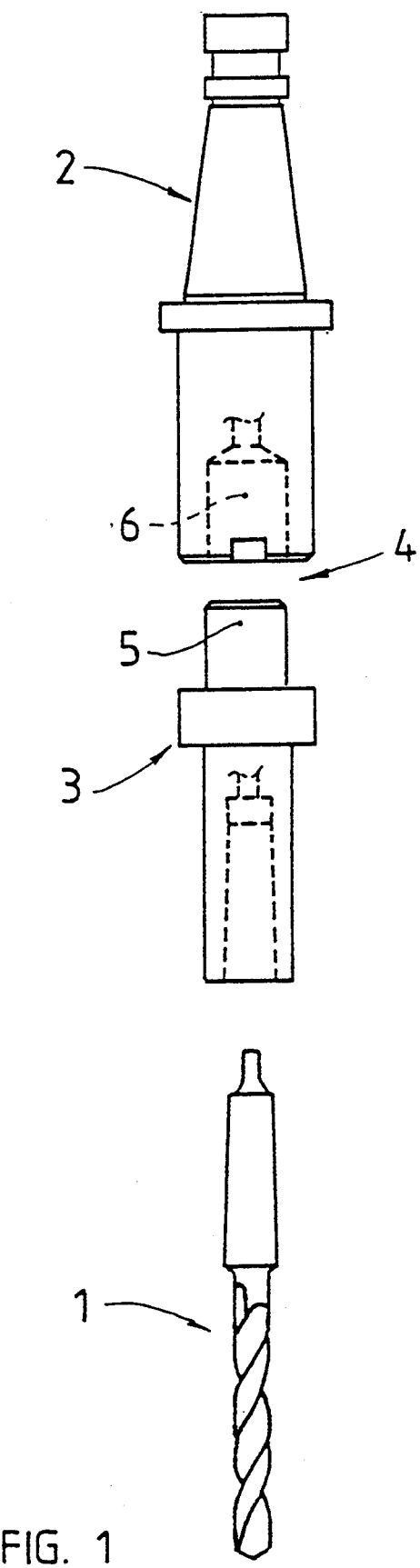
FIG. 1 is an exploded view of a chip-removing tool which fits in a conical seat in an extension designed to be coupled with the means according to the invention with a tool-holding cone.

As may be seen in FIG. 1, the tool 1 is to be coupled with a cone 2 for insertion into the chuck of the machine tool, the coupling being achieved by means of one or more extensions or intermediate elements 3. The coupling is formed in the zone indicated as a whole by 4 and is based on a male-female joint involving on the one hand a projecting pin 5 which has to be inserted with a close fit into a seat 6, forming a precise and highly rigid coupling. This state of the art is illustrated diagrammatically in FIG. 1.

Figure 2:
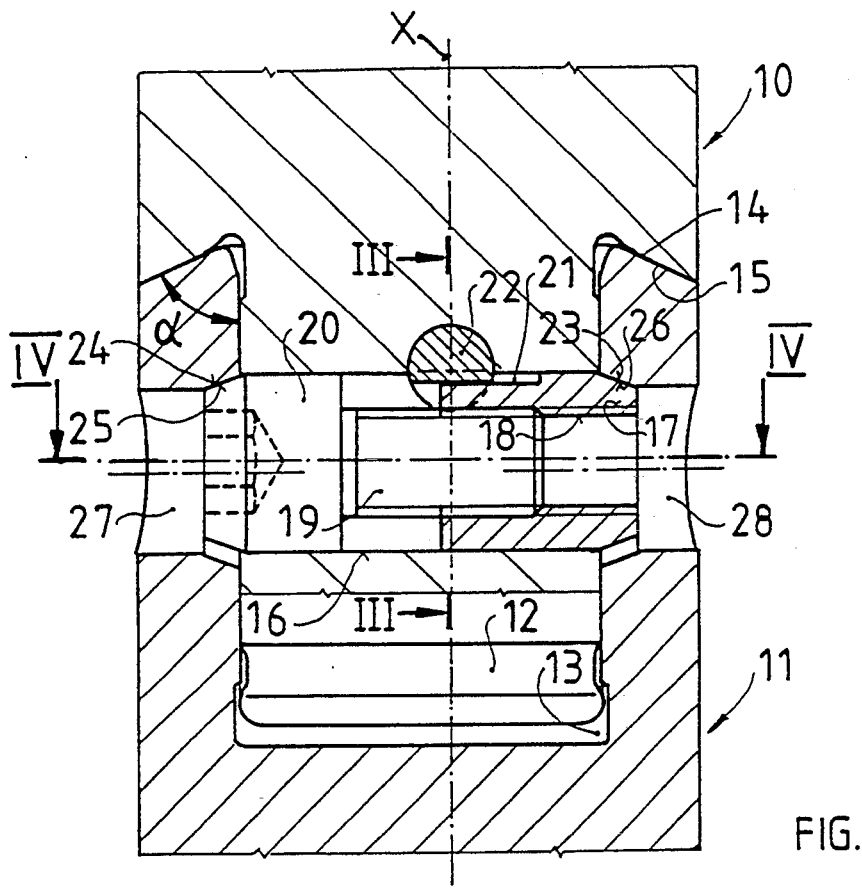
FIG. 2 is a sectional view of the details of the coupling device designed according to the present invention.

According to the present invention, as illustrated in FIG. 2, a cylindrical body 10 for connection to a cylindrical body 11 is provided with a projecting pin 12 which forms a close fit inside a seat 13 created in the second cylindrical body 11. Advantageously the pin 12 and the seat 13 are hardened and ground.

In order that a self-centering assembly can always be achieved between the cylindrical body 10 and the cylindrical body 11, it is provided that the circumferential wall 14 provided at the base of the pin 12 be given an inclined surface, advantageously one that descends from the pin 12 towards the outer circumference of the body 10. The angle of inclination (α), determining the angle of inclination of the wall 14 corresponds to approximately 65°.

Similarly, the free end of the body 11, close to the seat 13, also has an inclined circumferential surface, indicated by 15. This surface likewise descends towards the outer perimeter of the body 11. In the projection 12 a through hole 16 is formed and accepts an internally threaded 18 bush 17 that engages with the shank 19 of a cylindrical-headed screw 20.

The top of the bush 17 includes a flat 21 formed, for example, by milling and this flat is used to engage the flat part of a transverse dowel 22, thus preventing the bush 17 from rotating inside the hole 16.

As is shown in FIG. 2, the free end of the bush 17 has a circumferential surface 23 forming an inclined surface and likewise the cylindrical head 20 has at its free end a circumferential and inclined surface 24. The inclined surfaces 23 and 24 engage with inclined annular surfaces 25 and 26 which define on the side facing the seat 13 the through holes 27 and 28 formed in the body 11 beside the seat 13.

Advantageously the angle (β) formed between the longitudinal axis of the screw 20, 19 and the inclined surfaces 23, 24, 25 and 26 corresponds approximately to 20°.

This very acute angle (β) has the advantage, as may be easily shown by a diagram of the forces, that a very small tightening force on the screw (19, 20) directed in the axial direction generates a very high force component transmitted through the inclined surfaces (25, 26). A very high locking force is therefore generated despite the fact that the force with which the screw is tightened is low.

FIG. 2 also shows that the axis of the hole 16 formed through the pin 12 of the body 10 does not coincide with the axis of the holes 27, 28 formed through the body 11 beside the seat 13.

The non-coincidence of these axes causes the inclined surfaces 25 and 26 of the head 20 and of the bush 17 respectively to abut against the surfaces 24 and 23 of the holes 27 and 28 in such a way as, (during the expansion of the bush 17 and screw 19 system) to cause an axial movement between the cylindrical bodies 10, 11 with the result that the pin 12 is pushed towards the bottom of the seat 13 and that simultaneously the inclined surface 14 of the cylindrical body 10 is pressed strongly against the inclined surface 15.

Figure 3:
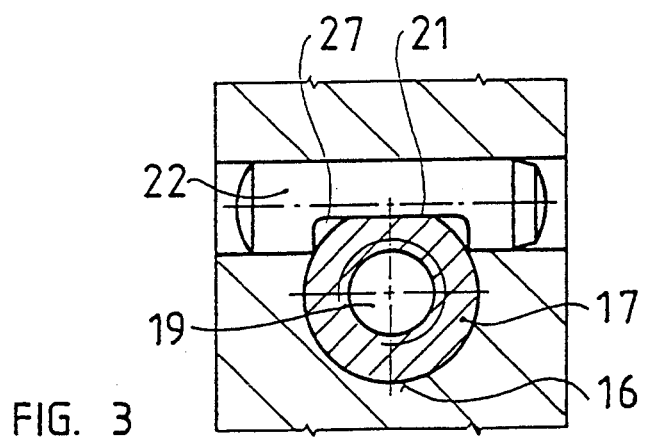
FIG. 3 is a sectional view taken through the line III—III in FIG. 2 of a detail of a positioning dowel.

In order that during the tightening of the screw 19, the threaded bush 17 cannot rotate inside the hole 16, the bush 17 has a flat 21 which engages in a geometrical fit with a flat 27 on a transverse dowel 22 (FIG. 3).

Figure 4:
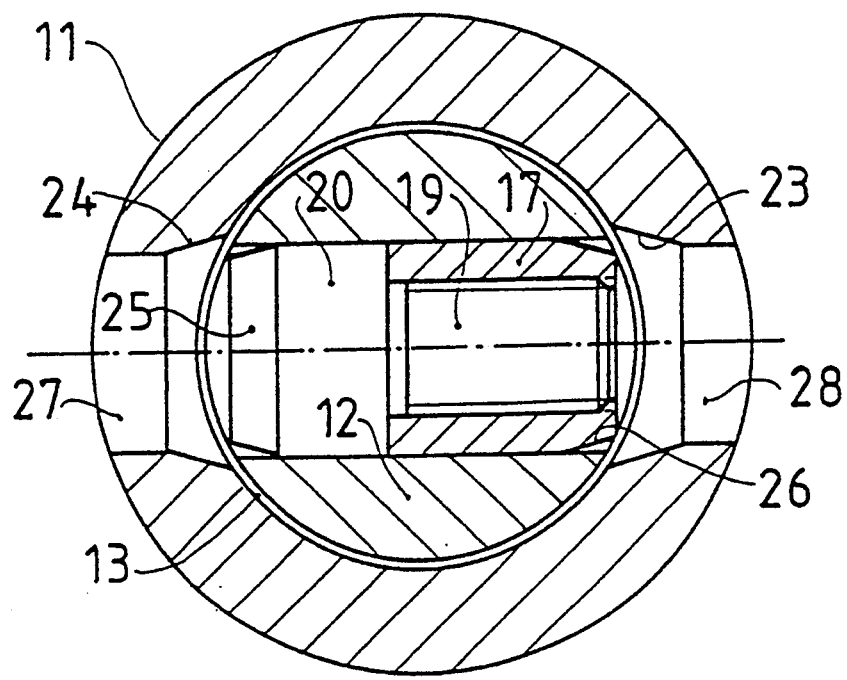
FIG. 4 is a sectional view taken through the line IV—IV of the coupling zone of the two cylindrical bodies, illustrating the screw and bush system in the rest position.
Figure 5:
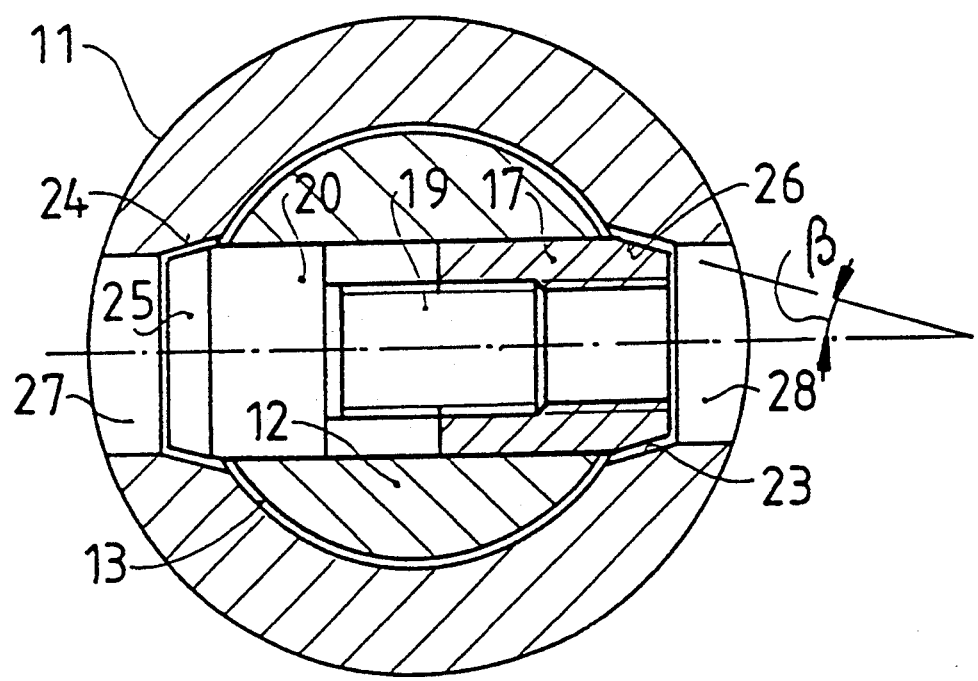
FIG. 5 is a sectional view identical to that shown in FIG. 4, with the screw and bush system in the locked position.

FIGS. 4 and 5 show transverse sections through the coupling zone between the cylindrical body 10 and the cylindrical body 11.

When the threaded shank 19 of the screw 20 has been screwed fully into the bush 17, the screw-bush system (20, 17) is then smaller in size than the diameter of the projecting pin 12. Hence the pin 12 can be freely inserted into the seat 13 in the cylindrical body 11.

To lock the two cylindrical bodies 10 and 11 together, the operator acts on a single screw 20, 19, causing the threaded shank 19 of the screw 20 and the internally threaded 18 bush 17 to move apart. Accordingly the system 20, 19, 17 grows wider in the transverse direction, bringing the top part of the inclined surfaces 26 and 24 of the head 20 and of the bush 17 into contact with the inclined surfaces 25 and 23, which internally define the holes 27 and 28, with the result that the cylindrical bodies 10 and 11 are locked together by reaction.

Figure 6:
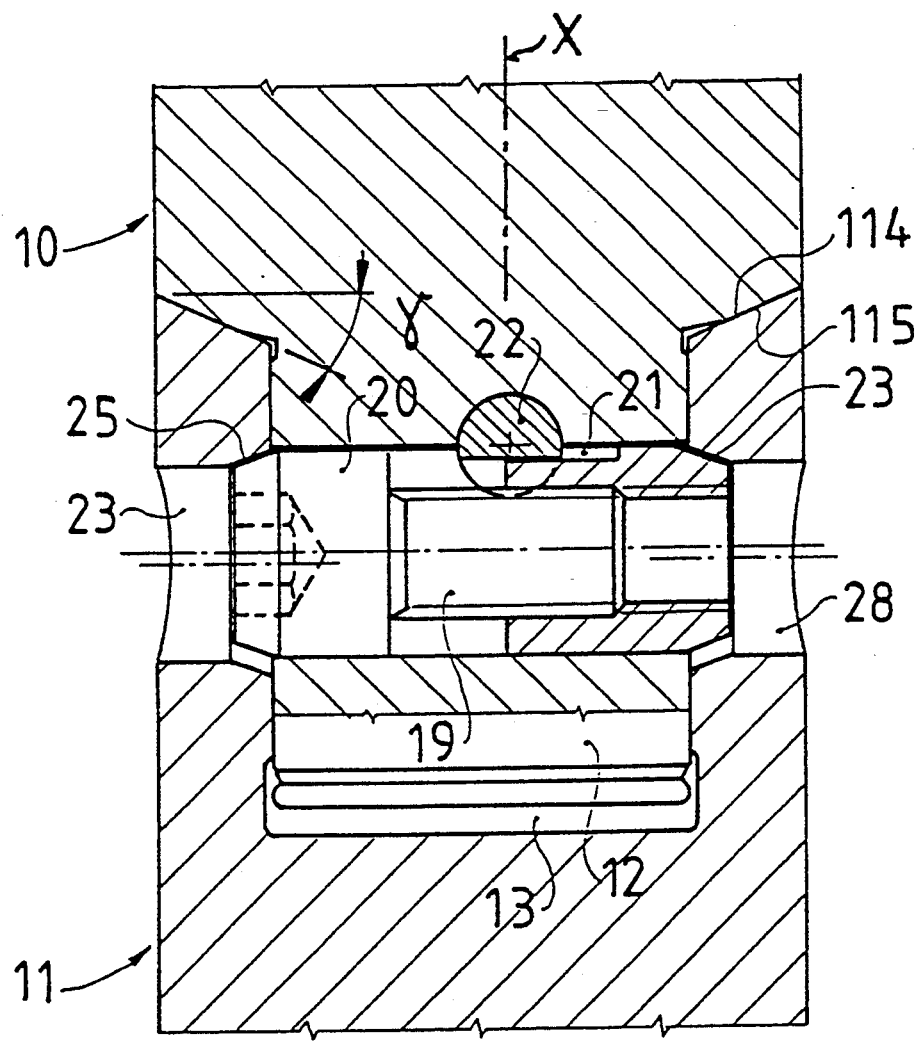
FIG. 6 shows another embodiment of the coupling device designed according to the invention.

Practical tests have demonstrated that it may be advantageous to construct the coupling device as illustrated in FIG. 6.

In FIG. 6 it can be seen that the coupling surfaces 114 and 115 can be shaped so as to rise away from the axis X of the pin 12 towards the outer circumference of the body 10. In other words what is formed is not an undercut coupling surface but an inclined surface which extends in a rising manner from the center of the device towards the exterior. This arrangement greatly simplifies the fabricating operations.

It is particularly advantageous if the angle γ between the surfaces 114 and 115 and a line perpendicular to the axis X corresponds approximately to 20° to 25°.

I claim:

1. A coupling arrangement, comprising:
   a) a first coupling member having a generally cylindrical pin extending along a longitudinal axis, and a generally cylindrical passage extending through the pin between opposite open end regions along a transverse axis that is generally perpendicular to the longitudinal axis;
   b) a second coupling member having an annular wall bounding a generally cylindrical seat that extends along the longitudinal axis, and a pair of spaced-apart ports extending through the annular wall and having frusto-conical inner surfaces;
   c) means for coupling the members between a coupled state in which the pin is lockingly received in the seat, and an uncoupled state in which the pin is unlocked from the seat, said coupling means including
      i) a bushing having a generally cylindrical portion which has an exterior, generally flattened surface, a frusto-conical end portion which has a frusto-conical outer surface, and a threaded bore that extends through the cylindrical and end portions of the bushing.
      ii) a threaded element having a frusto-conical outer surface and threadedly engaging the bushing, said element having a threaded shaft in threaded engagement with the bore, and a head having a frusto-conical end portion.
      iii) said frusto-conical outer surfaces being located at said opposite open end regions of the passage of the pin, and
      iv) means for moving the bushing and the element from a retracted position in which the bushing and the element are entirely contained within the passage of the pin in the uncoupled state, in opposite directions apart from each other away from the longitudinal axis, to an extended position in which the frusto-conical outer surfaces extend outwardly of the passage and respectively engage the frusto-conical inner surfaces of the posts in the coupled state;

d) a dowel mounted in the first coupling member and having a flat that engages the flattened surface of the bushing.

2. The arrangement according to claim 1, wherein a straight line extending along each frusto-conical outer surface of the bushing and the element, respectively, includes an angle of about 20° with respect to said transverse axis.

3. The arrangement according to claim 1, wherein the frusto-conical inner surfaces are centered on an offset, port axis that is generally perpendicular to said longitudinal axis and generally parallel to said transverse axis.

4. The arrangement according to claim 1, wherein the first coupling member has an inclined wall surrounding the pin and forming an acute angle with a straight line extending longitudinally along an outer surface of the pin, and wherein the annular wall of the second coupling member has an inclined rim that forms said same acute angle with a straight line extending longitudinally along an inner surface of the seat.

5. The arrangement according to claim 4, wherein said acute angle is about 65°.

6. The arrangement according to claim 4, wherein the first coupling member has an inclined wall surrounding the pin and forming an obtuse angle with a straight line extending longitudinally along an outer surface of the pin, and wherein the annular wall of the second coupling member has an inclined rim that forms said same obtuse angle with a straight line extending longitudinally along an inner surface of the seat.

7. The arrangement according to claim 6, wherein said obtuse angle is about 110° to about 115°.

8. The arrangement according to claim 1, wherein the coupling members are mounted in a tool rotatable about the longitudinal axis.

* * * * *